US006782621B2

(12) United States Patent
Giere et al.

(10) Patent No.: US 6,782,621 B2
(45) Date of Patent: Aug. 31, 2004

(54) METHOD OF FABRICATING A FLUID EJECTOR

(75) Inventors: Matthew Giere, San Diego, CA (US); Lawrence H. White, Corvallis, OR (US); Timothy L. Weber, Corvallis, OR (US)

(73) Assignee: Hewlett-Packard Developmental Company, L.P., Houston, TX (US)

( * ) Notice: Subject to any disclaimer, the term of this patent is extended or adjusted under 35 U.S.C. 154(b) by 0 days.

(21) Appl. No.: 10/376,135

(22) Filed: Feb. 27, 2003

(65) Prior Publication Data

US 2003/0151647 A1 Aug. 14, 2003

Related U.S. Application Data

(60) Division of application No. 10/000,110, filed on Oct. 31, 2001, now Pat. No. 6,554,404, which is a continuation-in-part of application No. 09/384,817, filed on Aug. 27, 1999, now Pat. No. 6,336,714, which is a continuation-in-part of application No. 09/033,504, filed on Mar. 2, 1998, now Pat. No. 6,126,276, and a continuation-in-part of application No. 09/314,551, filed on May 19, 1999, now Pat. No. 6,402,972, which is a continuation of application No. 08/597,746, filed on Feb. 7, 1996, now Pat. No. 6,000,787, and a continuation-in-part of application No. 09/033,987, filed on Mar. 2, 1998, now Pat. No. 6,162,589.

(51) Int. Cl.$^{7}$ .......... B23P 17/00

(52) U.S. Cl. .......... 29/890.1; 29/611; 29/830; 29/25.35

(58) Field of Search .......... 29/890.11, 611, 29/830, 25.35; 347/65, 61, 67, 63, 54, 56

(56) References Cited

U.S. PATENT DOCUMENTS

| | | | | | |
|---|---|---|---|---|---|
| 5,635,966 | A | * | 6/1997 | Keefe et al. | 347/43 |
| 5,652,609 | A | * | 7/1997 | Scholler et al. | 347/54 |
| 5,706,041 | A | * | 1/1998 | Kubby | 347/65 |
| 5,851,412 | A | * | 12/1998 | Kubby | 216/27 |
| 6,336,714 | B1 | | 1/2002 | Kawamura et al. | |

FOREIGN PATENT DOCUMENTS

| | | | |
|---|---|---|---|
| JP | 11-324562 | * 11/1999 | B41J/2/045 |

* cited by examiner

*Primary Examiner*—Carl J. Arbes
*Assistant Examiner*—Tai Van Nguyen

(57) ABSTRACT

A method of fabricating a fluid ejector is disclosed. In the present embodiment, a plurality of thin film layers are deposited on a first surface of a printhead substrate, the plurality of thin film layers form a thin film membrane. At least one of the layers forms a plurality of fluid ejection elements, and at least another of the layers forms a plurality of conductive leads to the fluid ejection elements. A plurality of fluid feed holes are formed in the thin film membrane. At least one opening in a second surface of the substrate is formed, the opening providing a fluid path from a second surface of the substrate through the substrate. The plurality of fluid feed holes are located over the at least one opening in the substrate, and all portions of the fluid ejection elements and conductive leads overlie the substrate.

13 Claims, 4 Drawing Sheets

METHOD OF FABRICATING A FLUID EJECTOR

CROSS-REFERENCE TO RELATED APPLICATIONS

This application is a division of Ser. No. 10/000,110 filed Oct. 31, 2001, now U.S. Pat. No. 6,554,404 which is a continuation-in-part of U.S. application Ser. No. 09/384,817, filed Aug. 27, 1999 now U.S. Pat. No. 6,336,714, entitled "Fully Integrated Thermal Inkjet Printhead Having Thin Film Layer Shelf," by Timothy L. Weber et al., which is a continuation-in-part of application Ser. No. 09/033,504 filed Mar. 2, 1998 now U.S. Pat. No. 6,126,276, issued Oct. 3, 2000, entitled, "Fluid Jet Printhead with Integrated Heat Sink," by Cohn C. Davis et al., and a continuation-in-part of U.S. patent application Ser. No. 09/314,551, filed May 19, 1999, now U.S. Pat. No. 6,402,972 entitled, "Solid State Ink Jet Printhead and Method of Manufacture," by Timothy L. Weber et al., which is a continuation of application Ser. No. 08/597,746 filed Feb. 7, 1996 now U.S. Pat. No. 6,000,787, issued Dec. 14, 1999, entitled "Solid State Ink Jet Print Head," by Timothy L. Weber et al., and a continuation-in-part of application Ser. No. 09/033,987 now U.S. Pat. No. 6,162,589, issued Dec. 19, 2000, entitled "Direct Imaging Polymer Fluid Jet Orifice," by Chien-Hua Chen et al. These applications are assigned to the present assignee and incorporated herein by reference.

FIELD OF THE INVENTION

Embodiments of the present invention relate to printers and, more particularly to a printhead for a printer.

BACKGROUND OF THE INVENTION

Printers typically have a printhead mounted on a carriage that scans back and forth across the width of a sheet of paper, as the paper is fed through the printer. Fluid from a fluid reservoir, either on-board the carriage or external to the carriage, is fed to fluid ejection chambers on the printhead. Each fluid ejection chamber contains a fluid ejection element, such as a heater resistor or a piezoelectric element, which is independently addressable. Energizing a fluid ejection element causes a droplet of fluid to be ejected through a nozzle to create a small dot on the paper. The pattern of dots created forms an image or text.

Hewlett-Packard is developing printheads that are formed using integrated circuit techniques. A thin film membrane, composed of various thin film layers, including a resistive layer, is formed on a top surface of a silicon substrate, and an orifice layer is formed on top of the thin film membrane. The various thin film layers of the thin film membrane are etched to provide conductive leads to fluid ejection elements, which may be heater resistor or piezoelectric elements. Fluid feed holes are also formed in the thin film layers. The fluid feed holes control the flow of fluid to the fluid ejection elements. The fluid flows from the fluid reservoir, across a bottom surface of the silicon substrate, into a trench formed in the silicon substrate, through the fluid feed holes, and into fluid ejection chambers where the fluid ejection elements are located.

The trench is etched in the bottom surface of the silicon substrate so that fluid can flow into the trench and into each fluid ejection chamber through the fluid feed holes formed in the thin film membrane. The trench completely etches away portions of the substrate near the fluid feed holes, so that the thin film membrane forms a shelf in the vicinity of the fluid feed holes.

One problem faced during development of these printheads is that the conductive leads in the thin film membrane extend over the trench and can develop cracks when the printhead is flexed or otherwise subjected to stress. Stresses can occur during assembly and operation of the printhead. When cracks propagate and intersect active resistor lines, they can cause a functional failure in the printhead. A crack that initially incapacitates a single resistor allows fluid to access the aluminum conductor. Aluminum corrodes quickly in fluid, particularly when supplied with an electrical potential to drive galvanic reactions. As a result, the problem that started with a single resistor can quickly spread to multiple nozzles or the entire printhead, as the corrosive fluid attacks the power bus. Thus, there is a need for an improved printhead that maintains its reliability throughout assembly and operation.

SUMMARY

Described herein is a printhead having a printhead substrate and a thin film membrane. The printhead substrate has at least one opening formed therein for providing a fluid path through the substrate. The thin film membrane is formed on a second surface of the substrate and extends over the opening in the substrate. The thin film membrane includes a plurality of fluid feed holes. Each fluid feed hole is located over the opening in the substrate. The thin film membrane further includes a plurality of fluid ejection elements and a plurality of conductive leads to the fluid ejection elements. All portions of the fluid ejection elements and conductive leads overlie the substrate.

BRIEF DESCRIPTION OF THE DRAWINGS

Embodiments of the present invention may be better understood, and its features and advantages made apparent to those skilled in the art, by referencing the accompanying drawings, wherein like reference numerals are used for like parts in the various drawings.

DETAILED DESCRIPTION

Figure 1:
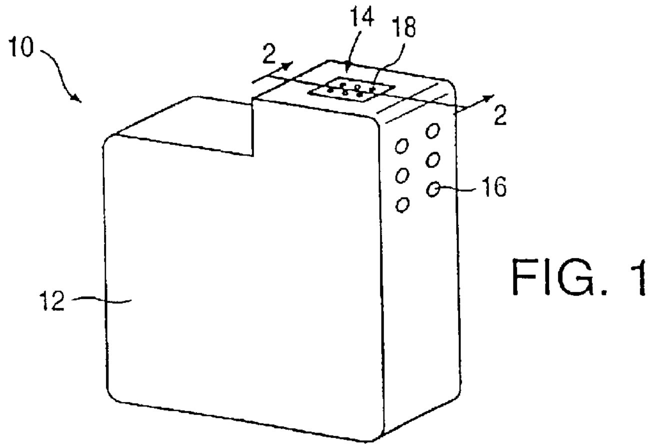
FIG. 1 is a perspective view of one embodiment of a print cartridge that may incorporate the printhead described herein.

FIG. 1 is a perspective view of one type of print cartridge 10 that may incorporate the printhead structure of the present invention. Print cartridge 10 is of the type that contains a substantial quantity of fluid within its body 12, but another suitable print cartridge may be the type that receives fluid from an external fluid supply either mounted on the printhead or connected to the printhead via a tube.

The fluid is supplied to a printhead 14. Printhead 14, to be described in detail later, channels the fluid into fluid ejection chambers, each chamber containing a fluid ejection element. Electrical signals are provided to contacts 16 to individually energize the fluid ejection elements to eject a droplet of fluid through an associated nozzle 18. The structure and operation of conventional print cartridges are very well known.

Embodiments of the present invention relate to the printhead portion of a print cartridge, or a printhead that can be permanently installed in a printer, and, thus, is independent of the fluid delivery system that provides fluid to the printhead. The invention is also independent of the particular printer, into which the printhead is incorporated.

Figure 2:
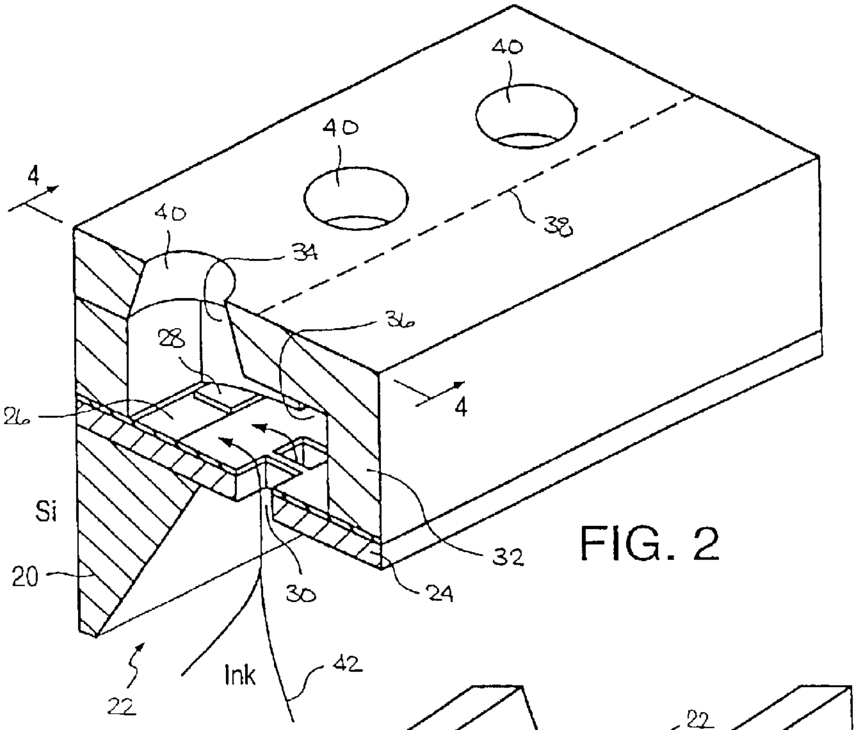
FIG. 2 is a perspective cutaway view, taken generally along line 2—2 in FIG. 1, of a portion of a printhead.

FIG. 2 is a cross-sectional view of a portion of the printhead of FIG. 1 taken generally along line 2—2 in FIG. 1. Although a printhead may have 300 or more nozzles and associated fluid ejection chambers, detail of only a single fluid ejection chamber need be described in order to understand the invention. It should also be understood by those skilled in the art that many printheads are formed on a single silicon wafer and then separated from one another using conventional techniques.

In FIG. 2, a silicon substrate 20 has an opening or trench 22 formed in a bottom surface thereof. Trench 22 provides a path for fluid to flow along the bottom surface and through substrate 20.

Formed on top of silicon substrate 20 is a thin film membrane 24. Thin film membrane 24 is composed of various thin film layers, to be described in detail later. The thin film layers include a resistive layer for forming fluid ejection elements or resistors 26. Other thin film layers perform various functions, such as providing electrical insulation from substrate 20, providing a thermally conductive path from the heater resistor elements to substrate 20, and providing electrical conductors to the resistor elements. One electrical conductor 28 is shown leading to one end of a resistor 26. A similar conductor leads to the other end of resistor 26. In an actual embodiment, the resistors and conductors in a chamber would be obscured by overlying layers.

Thin film membrane 24 includes fluid feed holes 30 that are formed completely through thin film membrane 24.

An orifice layer 32 is deposited over the surface of thin film membrane 24. Orifice layer 32 is adhered to the top surface of thin film membrane 24, such that the two form a composite.

Orifice layer 32 is etched to form fluid ejection chambers 34, one chamber per resistor 26. A manifold 36 is also formed in orifice layer 32 for providing a common fluid channel for a row of fluid ejection chambers 34. The inside edge of manifold 36 is shown by a dashed line 38. Nozzles 40 may be formed by laser ablation using a mask and conventional photolithography techniques.

Trench 22 in silicon substrate 20 extends along the length of the row of fluid feed holes 30 so that fluid 42 from a fluid reservoir may enter fluid feed holes 30 and supply fluid to fluid ejection chambers 34.

In one embodiment, each printhead is approximately one-half inch long and contains two offset rows of nozzles, each row containing 150 nozzles for a total of 300 nozzles per printhead. The printhead can thus print at a single pass resolution of 600 dots per inch (dpi) along the direction of the nozzle rows or print at a greater resolution in multiple passes. Greater resolutions may also be printed along the scan direction of the printhead. Resolutions of 1200 dpi or greater may be obtained using the present invention.

In operation, an electrical signal is provided to heater resistor 26, which vaporizes a portion of the fluid to form a bubble within an fluid ejection chamber 34. The bubble propels a fluid droplet through an associated nozzle 40 onto a medium. The fluid ejection chamber is then refilled by capillary action.

Figure 3:
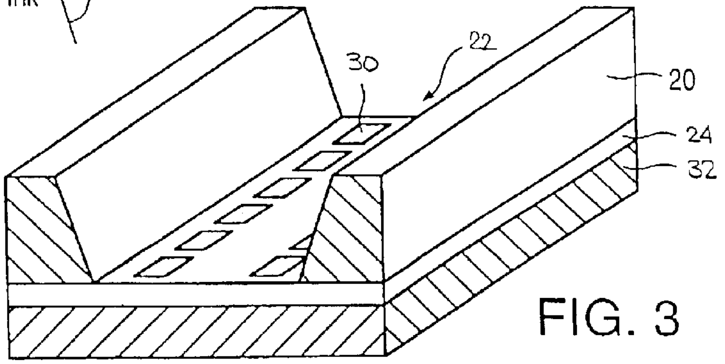
FIG. 3 is a perspective view of the underside of the printhead shown in FIG. 2.

FIG. 3 is a perspective view of the underside of the printhead of FIG. 2 showing trench 22 in substrate 20, and fluid feed holes 30 in thin film membrane 24. In the particular embodiment of FIG. 3, a single trench 22 provides access to two rows of fluid feed holes 30.

In one embodiment, the size of each fluid feed hole 30 is smaller than the size of a nozzle 40, so that particles in the fluid will be filtered by fluid feed holes 30 and will not clog nozzle 40. The clogging of a fluid feed hole will have little effect on the refill speed of a chamber, since there are multiple fluid feed holes supplying fluid to each chamber 34. In another embodiment, there are more fluid feed holes 30 than fluid ejection chambers 34.

Figure 4:
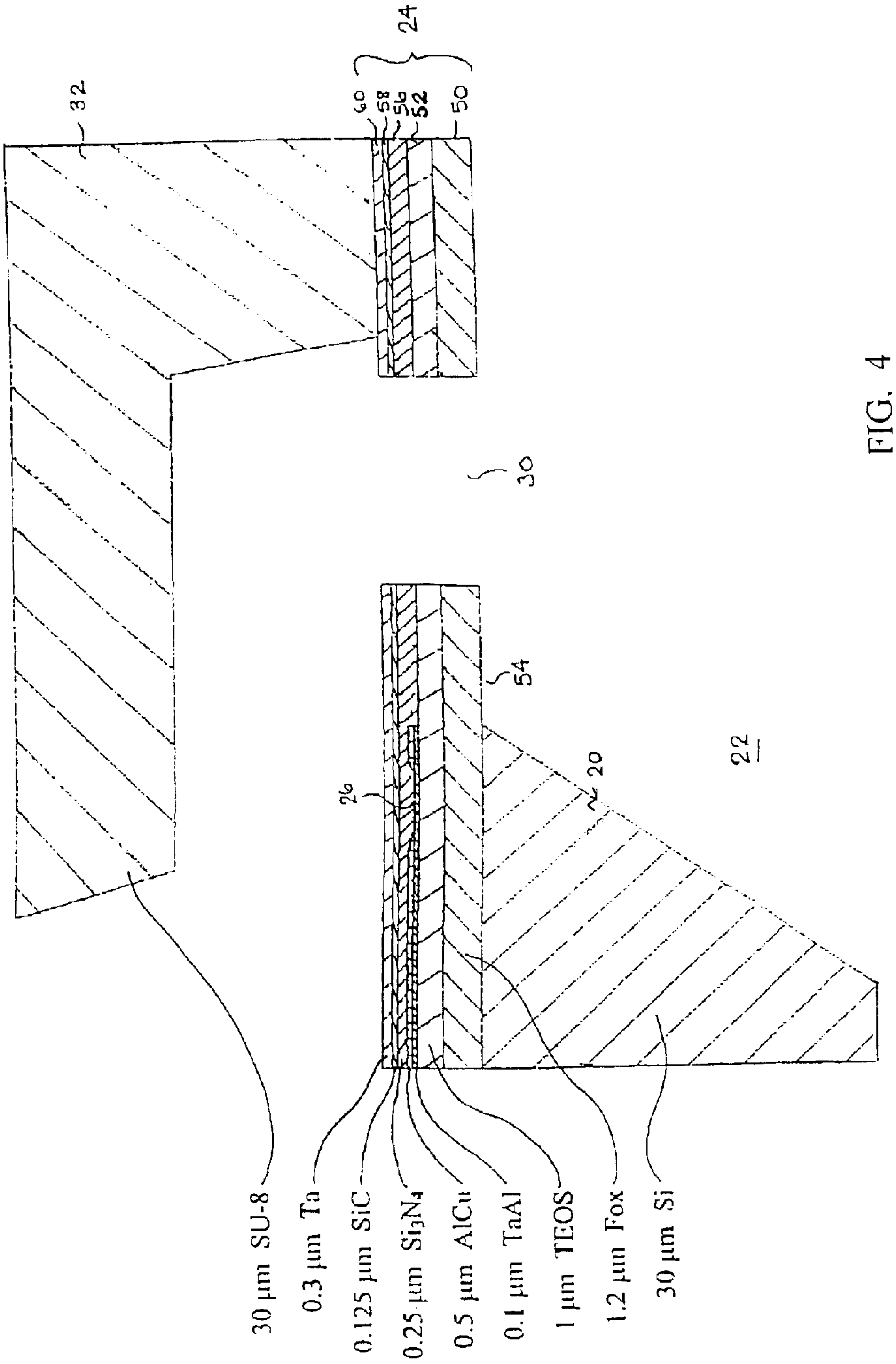
FIG. 4 is a cross-sectional view taken generally along line 4—4 in FIG. 3.

FIG. 4 is a cross-sectional view taken generally along line 44 in FIG. 2. FIG. 4 shows the individual thin film layers which comprise thin film membrane 24. In the particular embodiment of FIG. 4, the portion of silicon substrate 20 shown is approximately 30 microns thick. This portion is referred to as the bridge. The bulk silicon is approximately 675 microns thick.

A field oxide layer 50, having a thickness of 1.2 microns, is formed over silicon substrate 20 using conventional techniques. A tetraethyl orthosilicate (TEOS) layer 52, having a thickness of 1.0 microns, is then applied over the layer of oxide 50. A boron TEOS (BTEOS) layer may be used instead.

A resistive layer of, for example, tantalum aluminum (TaAl), having a thickness of 0.1 microns, is then formed over TEOS layer 52. Other known resistive layers can also be used.

Figure 5:
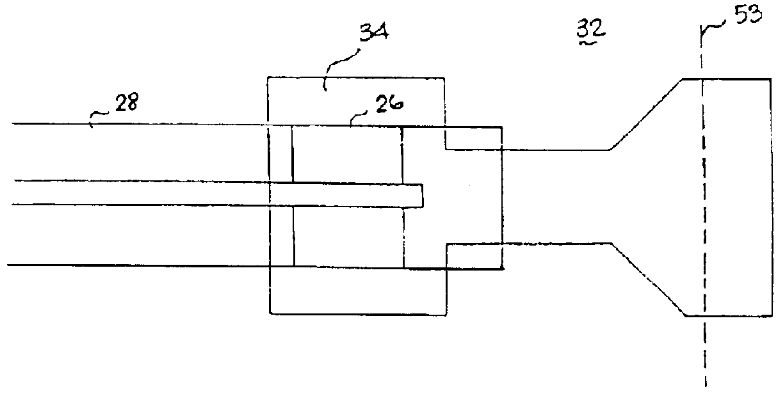
FIG. 5 is a top-down view of the conductor routing for a fluid ejection chamber in the printhead shown in FIG. 2.

A patterned metal layer, such as an aluminum-copper alloy, having a thickness of 0.5 microns, overlies the resistive layer for providing an electrical connection to the resistors. In FIG. 5, a top-down view of the conductor routing is shown. Conductors 28 leading to resistors 26 are shown within a fluid ejection chamber 34, defined by an opening in the orifice layer 32. The orifice layer opening to the right of dashed line 53 overlies a fluid feed hole 30. The conductive AlCu traces are etched to reveal portions of the TaAI layer to define a first resistor dimension (e.g., a width). A second resistor dimension (e.g., a length) is defined by etching the AlCu layer to cause a resistive portion to be contacted by AlCu traces at two ends. This technique of forming resistors and electrical conductors is well known in the art.

Referring back to FIG. 4, TEOS layer 52 and field oxide layer 50 provide electrical insulation between resistors 26 and substrate 20, as well as an etch stop when etching substrate 20. In addition, field oxide layer 50 provides a mechanical support for an overhang portion 54 of thin film membrane 24. The TEOS and field oxide layers also insulate polysilicon gates of transistors (not shown) used to couple energization signals to the resistors 26.

Over the resistors 26 and AlCu metal layer is formed a silicon nitride ($Si_3N_4$) layer 56, having a thickness of 0.25 microns. This layer provides insulation and passivation. Prior to nitride layer 56 being deposited, the resistive and patterned metal layers are etched to pull back both layers from fluid feed holes 30 so as not to be in contact with any fluid. This is because the resistive and patterned metal layers are vulnerable to certain fluids and the etchant used to form trench 22. Etching back a layer to protect the layer from fluid also applies to the polysilicon layer in the printhead.

Over the nitride layer 56 is formed a layer 58 of silicon carbide (SiC), having a thickness of 0.125 microns, to provide additional insulation and passivation. Other dielectric layers may be used instead of nitride and carbide.

Carbide layer 58 and nitride layer 56 are also etched to expose portions of the AlCu traces for contact to subsequently formed ground lines (out of the field of FIG. 4).

On top of carbide layer 58 is formed an adhesive layer 60 of tantalum (Ta), having a thickness of 0.3 microns. The tantalum also functions as a bubble cavitation barrier over the resistor elements. This layer 60 contacts the AlCu conductive traces through the openings in the nitride/carbide layers.

Gold (not shown) is deposited over tantalum layer 60 and etched to form ground lines electrically connected to certain ones of the AlCu traces. Such conductors may be conventional.

The AlCu and gold conductors may be coupled to transistors formed on the substrate surface. Such transistors are described in U.S. Pat. No. 5,648,806, assigned to the present assignee and incorporated herein by reference. The conductors may terminate at electrodes along edges of substrate 20.

A flexible circuit (not shown) has conductors, which are bonded to the electrodes on substrate 20 and which terminate in contact pads 16 (FIG. 1) for electrical connection to the printer.

Fluid feed holes 30 are formed by etching through the layers that form thin film membrane 24. In one embodiment, a single feed hole and gap mask is used. In another embodiment, several masking and etching steps are used as the various thin film layers are formed.

Orifice layer 32 is then deposited and formed, followed by the etching of the trench 22. In another embodiment, the trench etch is conducted before the orifice layer fabrication. Orifice layer 32 may be formed of a spun-on epoxy called SU-8. Orifice layer 32 in one embodiment is approximately 30 microns.

A backside metal may be deposited, if necessary, to better conduct heat from substrate 20 to the fluid.

Figure 6:
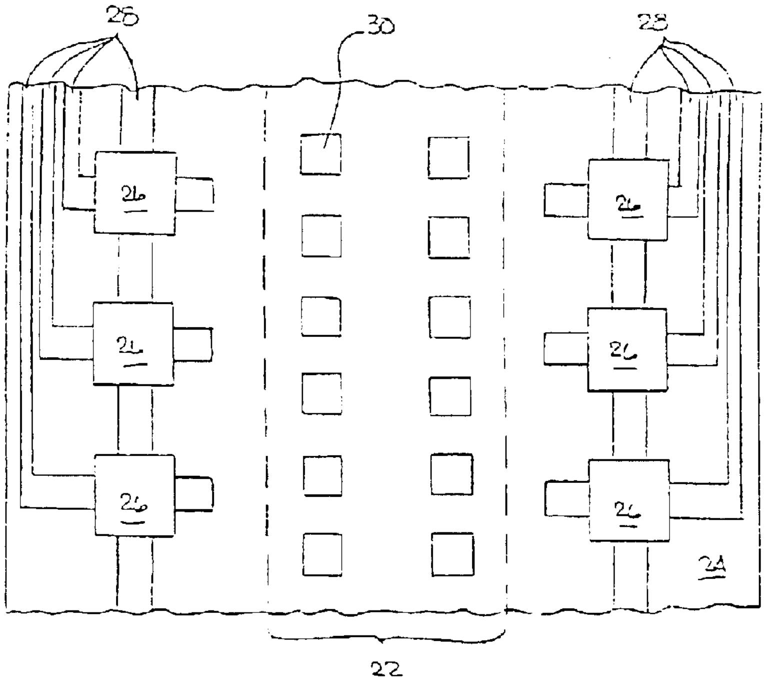
FIG. 6 is a top-down view of the printhead of FIG. 2, with the orifice layer removed, showing the pertinent electronic circuitry.

As illustrated in FIGS. 4 and 6, none of the electrical circuitry of the printhead is undercut by trench 22 in substrate 20. Resistors 26 are fully supported by substrate 20. In addition, the patterned metal layer has been etched back such that conductive leads 28 do not extend over trench 22. Since the electrical circuitry is not undercut by trench 22, but rather located over intact silicon, it is less likely to develop stress-induced cracks, which can lead to failure of one or more resistors in the printhead. Thus, careful placement of the resistors and conductive leads away from any trenches or openings in the substrate greatly improves both thermal performance and reliability of the printhead.

Figure 7:
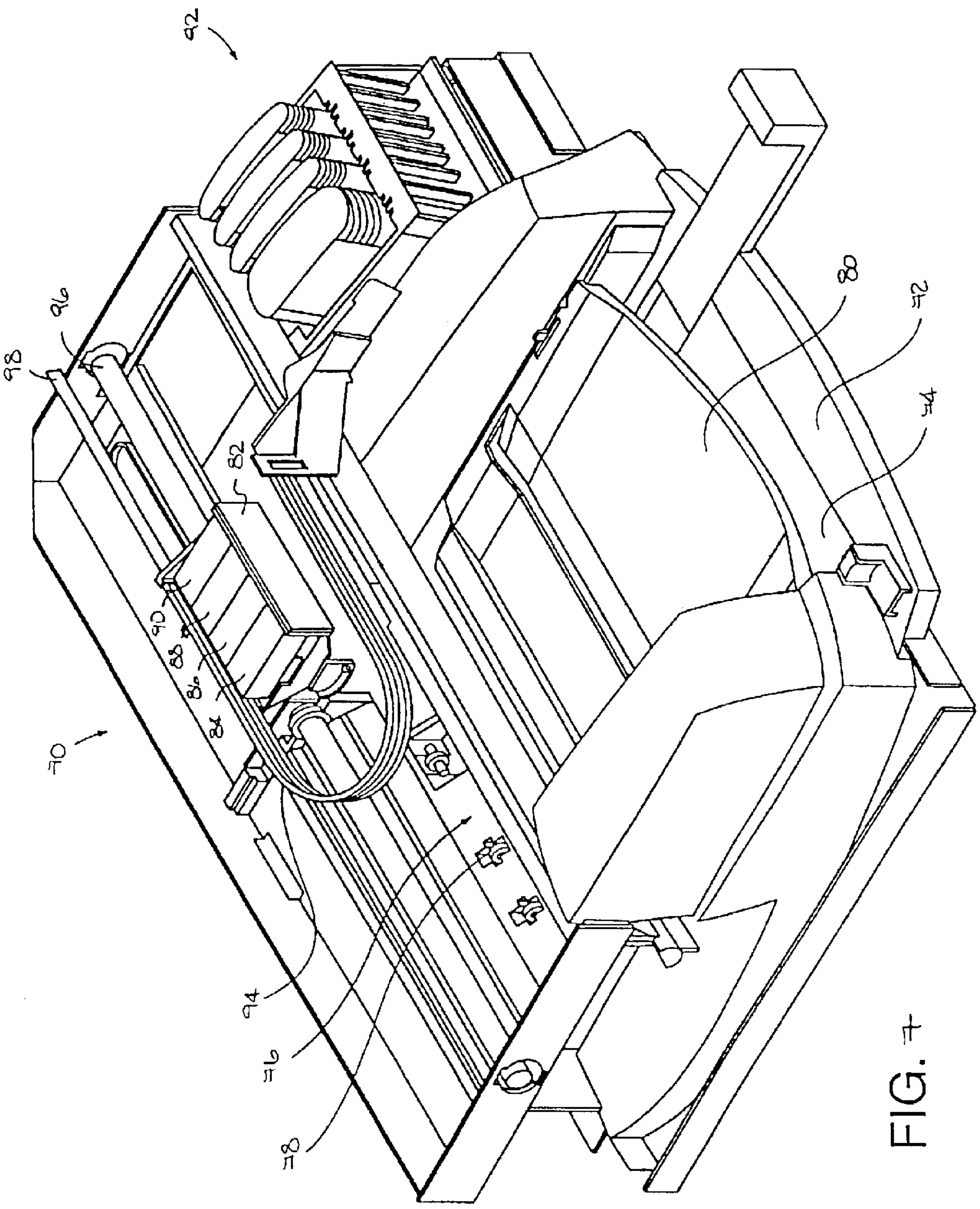
FIG. 7 is a perspective view of a conventional printer, into which the various embodiments of printheads may be installed for printing on a medium.

FIG. 7 illustrates one embodiment of a printer 70 that can incorporate various embodiments of printheads. Numerous other designs of printers may also be used. More detail of a printer is found in U.S. Pat. No. 5,582,459, to Norman Pawlowski et al., incorporated herein by reference.

Printer 70 includes an input tray 72 containing sheets of paper 74, which are forwarded through a print zone 76 using rollers 78 for being printed upon. Paper 74 is then forwarded to an output tray 80. A moveable carriage 82 holds print cartridges 82, 84, 86 and 99, which respectively print cyan (C), black (K), magenta (M), and yellow (Y) fluid.

In one embodiment, fluids in replaceable fluid cartridges 92 are supplied to their associated print cartridges via flexible fluid tubes 94. The print cartridges may also be the type that hold a substantial supply of fluid and may be refillable or non-refillable. In another embodiment, the fluid supplies are separate from the printhead portions and are removably mounted on the printheads in carriage 82.

Carriage 82 is moved along a scan axis by a conventional belt and pulley system and slides along a slide rod 96. In another embodiment, the carriage is stationary, and an array of stationary print cartridges print on a moving sheet of paper.

Printing signals from a conventional external computer (e.g., a PC) are processed by printer 70 to generate a bitmap of the dots to be printed. The bitmap is then converted into firing signals for the printheads. The position of the carriage 82 as it traverses back and forth along the scan axis while printing is determined from an optical encoder strip 98, detected by a photoelectric element on carriage 82, to cause the various fluid ejection elements on each print cartridge to be selectively fired at the appropriate time during a carriage scan.

The printhead may use resistive, piezoelectric, or other types of fluid ejection elements.

As the print cartridges in carriage 82 scan across a sheet of paper, the swaths printed by the print cartridges overlap. After one or more scans, the sheet of paper 74 is shifted in a direction towards output tray 80, and carriage 82 resumes scanning.

The present invention is equally applicable to alternative printing systems (not shown) that utilize alternative media and/or printhead moving mechanisms, such as those incorporating grit wheel, roll feed, or drum or vacuum belt technology to support and move the print media relative to the printhead assemblies. With a grit wheel design, a grit wheel and pinch roller move the media back and forth along one axis while a carriage carrying one or more printhead assemblies scan past the media along an orthogonal axis. With a drum printer design, the media is mounted to a rotating drum that is rotated along one axis while a carriage carrying one or more printhead assemblies scans past the medial along an orthogonal axis. In either the drum or grit wheel designs, the scanning is typically not done in a back and forth manner as is the case for the system depicted in FIG. 7.

Multiple printheads may be formed on a single substrate. Further, an array of printheads may extend across the entire width of a page so that no scanning of the printheads is needed; only the paper is shifted perpendicular to the array.

Additional print cartridges in the carriage may include other colors or fixers.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of fabricating a fluid ejector comprising:

depositing a plurality of thin film layers on a first surface of a printhead substrate, the plurality of thin film layers forming a thin film membrane, at least one of the layers forming a plurality of fluid ejection elements, at least another of the layers forming a plurality of conductive leads to the fluid ejection elements;

forming a plurality of fluid feed holes in the thin film membrane;

forming at least one opening in a second surface of the substrate, the at least one opening providing a fluid path from a second surface of the substrate through the substrate, wherein the plurality of fluid feed holes are located over the at least one opening in the substrate, and wherein all portions of the fluid ejection elements and conductive leads overlie the substrate.

2. The method of claim 1, wherein forming the at least one opening in the second surface of the substrate includes maintaining a portion of the substrate underlying each of the fluid ejection elements and conductive leads.

3. The method of claim 1, further comprising forming an orifice layer on the thin film membrane, the orifice layer defining a plurality of fluid ejection chambers, each chamber housing an associated fluid ejection element, the orifice layer further defining a nozzle for each fluid ejection chamber.

4. The method of claim 1, wherein depositing the plurality of thin film layers on the first surface of the substrate includes depositing a field oxide layer.

5. The method of claim 4, wherein forming the at least one opening in the second surface of the substrate includes etching a trench in the second surface and using the field oxide layer as an etch stop.

6. The method of claim 4, wherein depositing the plurality of thin film layers on the first surface of the substrate further includes depositing a protective layer, the protective layer overlying the field oxide layer.

7. A method of fabricating a fluid ejector comprising:

depositing a first thin film layer on a first surface of a substrate;

depositing at least a second thin film layer on the first second thin film layer; forming a plurality of conductive leads in at least one of the second thin film layers;

forming a plurality of fluid feed holes in the first thin film layer and the second thin film layers; and forming at least one opening in a second surface of the substrate, the at least one opening providing a fluid path through at least a portion of the substrate.

8. The method of claim 7, further comprising forming a plurality of fluid feed paths over the at least one opening in the substrate, and wherein all portions of the fluid ejection elements and conductive leads overlie the substrate.

9. The method of claim 7, wherein forming the at least one opening in the second surface includes maintaining a portion of the substrate underlying each of the conductive leads.

10. The method of claim 7, further comprising forming an orifice layer on the at least one second thin film layer, the orifice layer defining a plurality of fluid ejection chambers, the orifice layer further defining a nozzle for each fluid ejection chamber.

11. The method of claim 7, wherein depositing the at least one second thin film layer includes depositing a field oxide layer.

12. The method of claim 11, wherein forming the at least one opening includes etching a trench in the second surface and using the field oxide layer as an etch stop.

13. The method of claim 11, wherein d depositing the at least one second thin film layer includes depositing a protective layer, the protective layer overlying the field oxide layer.

* * * * *